(12) United States Patent
Cherkasova et al.

(10) Patent No.: US 8,799,916 B2
(45) Date of Patent: Aug. 5, 2014

(54) DETERMINING AN ALLOCATION OF RESOURCES FOR A JOB

(75) Inventors: Ludmila Cherkasova, Sunnyvale, CA (US); Abhishek Verma, Champaign, IL (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 727 days.

(21) Appl. No.: 13/019,529

(22) Filed: Feb. 2, 2011

(65) Prior Publication Data

US 2012/0198466 A1 Aug. 2, 2012

(51) Int. Cl.
*G06F 9/46* (2006.01)
(52) U.S. Cl.
USPC .......... 718/104; 718/100; 718/101; 718/102; 718/103
(58) Field of Classification Search
None
See application file for complete search history.

(56) References Cited

U.S. PATENT DOCUMENTS

2010/0262695 A1 10/2010 Mays
2011/0307899 A1* 12/2011 Lee et al. ...................... 718/104

OTHER PUBLICATIONS

Wang et al. Using Realistic Simulation for Performance Analysis of MapReduce Setups. [online] (2009). ACM, pp. 1-78. Retrieved From the Internet <http://people.cs.vt.edu/~butta/docs/Isap09-mrperf.pdf>.*
Konwinski, Andrew, Improving MapReduce Performance in Heterogeneous Environments, Technical Report No. UCB/EECS-2009-183, Dec. 17, 2009 (40 pages).
Dean et al., MapReduce: Simplified Data Processing on Large Clusters, Google, Inc., OSDI 2004 (13 pages).
Polo et al., Performance-Driven Task Co-Scheduling for MapReduce Environments, 2010 (8 pages).
Iverson et al., Statistical Prediction of Task Execution Times Through Analytic Benchmarking for Scheduling in a Heterogeneous Environment, 1999 (13 pages).
Shoukat Ali et al., Task Execution Time Modeling for Heterogeneous Computing Systems, 0-7695-0556-2, 2000 IEEE (15 pages).
Wang et al., Using Realistic Simulation for Performance Analysis of MapReduce Setups, ACM 978-1-60558-592, Jun. 10, 2009 (8 pages).
Polo et al., Adaptive Task Scheduling for MultiJob MapReduce Environments, Proceedings of the 12th IEEE/IFIP Network Operations and Management Symposium, IEEE, Osaka, Japan, 2010 (8 pages).
Phan et al., Real-time MapReduce Scheduling, University of Pennsylvania, 2010 (6 pages).
Zhang et al., Abstract only—Predicting Running Time of Grid Tasks based on CPU Load Predictions, ISBN: 1-4244-0343-X-2006 7th IEEE/ACM International Conference on Grid Computing (1 page).
Driscoll et al., Abstract only—Accurate Predictions of Parallel Program Execution Time, Portland State University, 2002 (1 page).

(Continued)

*Primary Examiner* — Emerson Puente
*Assistant Examiner* — Jonathan R Labud (57) ABSTRACT

A job profile describes characteristics of a job. A performance parameter is calculated based on the job profile, and using a value of the performance parameter, an allocation of resources is determined to assign to the job to meet a performance goal associated with a job.

17 Claims, 3 Drawing Sheets

(56) References Cited

OTHER PUBLICATIONS

Abhishek Verma et al., Estimating a Performance Characteristic of a Job Using a Performance Model, PCT Application No. PCT/US11/23438 filed Feb. 2, 2011 (27 pages).

Aboulnaga. A.. et al Packing the most onto your cloud, IN: the first international workshop on Cloud data management, ACM New York. NY, USA, 2009 (4 pages).

Herodotou et al.: Profiling, Whatif Analysis, and Costbased Optimization of MapReduce Programs. IN: the VLDB endowment. vol. 4. No. II. Aug. 11-Sep. 3, 2011 (12 pages).

Ranger, C.. et al Evaluating MapReduce for multi-core and multiprocessor systems, Evaluating mapreduce for multi-core and multiprocessor systems. IN: p roceedings of 13th International Symposium on High-Performance Computer Arc tetecture (HPCA), 2007 (12 pages).

* cited by examiner

DETERMINING AN ALLOCATION OF RESOURCES FOR A JOB

BACKGROUND

Many enterprises (such as companies, educational organizations, and government agencies) employ relatively large volumes of data that are often subject to analysis. A substantial amount of the data of an enterprise can be unstructured data, which is data that is not in the format used in typical commercial databases. Existing infrastructure may not be able to efficiently handle the processing of relatively large volumes of unstructured data.

BRIEF DESCRIPTION OF THE DRAWINGS

Some embodiments are described with respect to the following figures.

DETAILED DESCRIPTION

For processing relatively large volumes of unstructured data, a MapReduce framework provides a distributed computing platform can be employed. Unstructured data refers to data not formatted according to a format of a relational database management system. An open-source implementation of the MapReduce framework is Hadoop. The MapReduce framework is increasingly being used across the enterprise for distributed, advanced data analytics and enabling new applications associated with data retention, regulatory compliance, e-discovery, and litigation issues. Diverse applications can be run over the same data sets to efficiently utilize the resources of large distributed systems.

Generally, the MapReduce framework includes a master node and multiple slave nodes. A MapReduce job submitted to the master node is divided into multiple map tasks and multiple reduce tasks, which are executed in parallel by the slave nodes. The map tasks are defined by a map function, while the reduce tasks are defined by a reduce function. Each of the map and reduce functions are user-defined functions that are programmable to perform target functionalities.

The map function processes corresponding segments of input data to produce intermediate results, where each of the multiple map tasks (that are based on the map function) process corresponding segments of the input data. For example, the map tasks process input key-value pairs to generate a set of intermediate key-value pairs. The reduce tasks (based on the reduce function) produce an output from the intermediate results. For example, the reduce tasks merge the intermediate values associated with the same intermediate key.

More specifically, the map function takes input key-value pairs $(k_1, v_1)$ and produces a list of intermediate key-value pairs $(k_2, v_2)$. The intermediate values associated with the same key $k_2$ are grouped together and then passed to the reduce function. The reduce function takes an intermediate key $k_2$ with a list of values and processes them to form a new list of values $(v_3)$, as expressed below.

$$\text{map}(k_1, v_1) \rightarrow \text{list}(k_2, v_2)$$

$$\text{reduce}(k_2, \text{list}(v_2)) \rightarrow \text{list}(v_3)$$

The multiple map tasks and multiple reduce tasks are designed to be executed in parallel across resources of a distributed computing platform. Since it is possible for multiple jobs (where each job includes its respective sets of map tasks and reduce tasks) to execute concurrently in the distributed computing platform, a resource allocator can be provided to determine respective allocations of resources to the corresponding jobs to allow the performance goals of the respective jobs to be satisfied.

The resource allocator according to some implementations employs a performance model that takes into account the job profile of a given job, along with other parameters (discussed further below) for determining what allocation of resources can satisfy the performance goal associated with the given job. In the context of a job having map tasks and reduce tasks, the allocated resources include a number of map slots and a number of reduce slots. Map slots and reduce slots are discussed further below.

In some examples, the performance goal associated with a job can be expressed as a target completion time, which can be a specific deadline, or some other indication of a time duration within which the job should be executed. Other performance goals can be used in other examples. For example, a performance goal can be expressed as a service level objective (SLO), which specifies a level of service to be provided (expected performance, expected time, expected cost, etc.).

Although reference is made to the MapReduce framework in some examples, it is noted that techniques or mechanisms according to some implementations can be applied in other distributed processing frameworks. More generally, map tasks are used to process input data to output intermediate results, based on a predefined function that defines the processing to be performed by the map tasks. Reduce tasks take as input partitions of the intermediate results to produce outputs, based on a predefined function that defines the processing to be performed by the reduce tasks. The map tasks are considered to be part of a map stage, whereas the reduce tasks are considered to be part of a reduce stage. In addition, although reference is made to unstructured data in some examples, techniques or mechanisms according to some implementations can also be applied to structured data formatted for relational database management systems.

Figure 1:
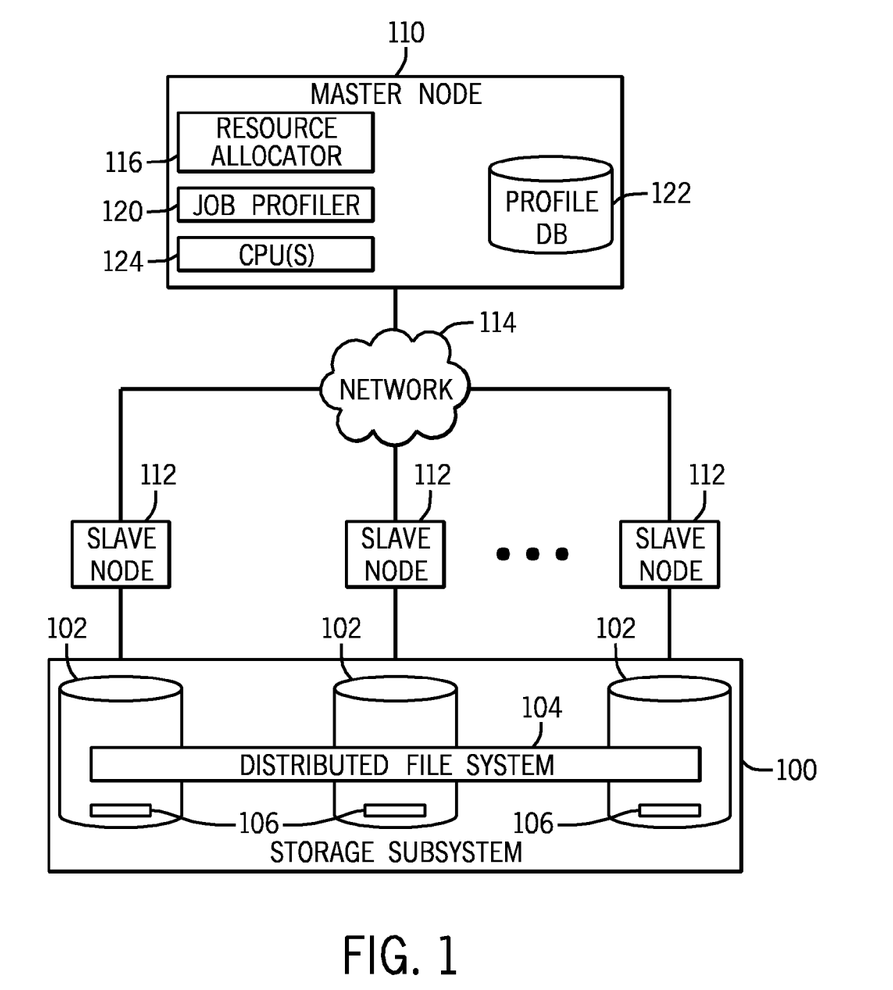
FIG. 1 is a block diagram of an example arrangement that incorporates some implementations.

FIG. 1 illustrates an example arrangement that provides a distributed processing framework that includes mechanisms according to some implementations for estimating performance characteristics of jobs to be executed in the distributed processing framework. As depicted in FIG. 1, a storage subsystem 100 includes multiple storage modules 102, where the multiple storage modules 102 can provide a distributed file system 104. The distributed file system 104 stores multiple segments 106 of input data across the multiple storage modules 102. The distributed file system 104 can also store outputs of map and reduce tasks.

The storage modules 102 can be implemented with storage devices such as disk-based storage devices or integrated circuit storage devices. In some examples, the storage modules 102 correspond to respective different physical storage devices. In other examples, plural ones of the storage modules 102 can be implemented on one physical storage device, where the plural storage modules correspond to different partitions of the storage device.

The system of FIG. 1 further includes a master node 110 that is connected to slave nodes 112 over a network 114. The network 114 can be a private network (e.g., a local area network or wide area network) or a public network (e.g., the Internet), or some combination thereof. The master node 110 includes one or more central processing units (CPUs) 124. Each slave node 112 also includes one or more CPUs (not shown). Although the master node 110 is depicted as being separate from the slave nodes 112, it is noted that in alternative examples, the master node 112 can be one of the slave nodes 112.

A "node" refers generally to processing infrastructure to perform computing operations. A node can refer to a computer, or a system having multiple computers. Alternatively, a node can refer to a CPU within a computer. As yet another example, a node can refer to a processing core within a CPU that has multiple processing cores. More generally, the system can be considered to have multiple processors, where each processor can be a computer, a system having multiple computers, a CPU, a core of a CPU, or some other physical processing partition.

In accordance with some implementations, the master node 110 is configured to perform scheduling of jobs on the slave nodes 112. The slave nodes 112 are considered the working nodes within the cluster that makes up the distributed processing environment.

Each slave node 112 has a fixed number of map slots and reduce slots, where map tasks are run in respective map slots, and reduce tasks are run in respective reduce slots. The number of map slots and reduce slots within each slave node 112 can be preconfigured, such as by an administrator or by some other mechanism. The available map slots and reduce slots can be allocated to the jobs. The map slots and reduce slots are considered the resources used for performing map and reduce tasks. A "slot" can refer to a time slot or alternatively, to some other share of a processing resource that can be used for performing the respective map or reduce task. Depending upon the load of the overall system, the number of map slots and number of reduce slots that can be allocated to any given job can vary.

The slave nodes 112 can periodically (or repeatedly) send messages to the master node 110 to report the number of free slots and the progress of the tasks that are currently running in the corresponding slave nodes. Based on the availability of free slots (map slots and reduce slots) and the rules of a scheduling policy, the master node 110 assigns map and reduce tasks to respective slots in the slave nodes 112.

Each map task processes a logical segment of the input data that generally resides on a distributed file system, such as the distributed file system 104 shown in FIG. 1. The map task applies the map function on each data segment and buffers the resulting intermediate data. This intermediate data is partitioned for input to the multiple reduce tasks.

The reduce stage (that includes the reduce tasks) has three phases: shuffle phase, sort phase, and reduce phase. In the shuffle phase, the reduce tasks fetch the intermediate data from the map tasks. In the sort phase, the intermediate data from the map tasks are sorted. An external merge sort is used in case the intermediate data does not fit in memory. Finally, in the reduce phase, the sorted intermediate data (in the form of a key and all its corresponding values, for example) is passed on the reduce function. The output from the reduce function is usually written back to the distributed file system 104.

The master node 110 of FIG. 1 includes a job profiler 120 that is able to create a job profile for a given job, in accordance with some implementations. The job profile describes characteristics of the given job to be performed by the system of FIG. 1. A job profile created by the job profiler 120 can be stored in a job profile database 122. The job profile database 122 can store multiple job profiles, including job profiles of jobs that have executed in the past.

In other implementations, the job profiler 120 and/or profile database 122 can be located at another node.

The master node 110 also includes a resource allocator 116 that is able to allocate resources, such as numbers of map slots and reduce slots, to a job, given a performance goal (e.g., target completion time) associated with a job. The resource allocator 116 receives as input a job profile, which can be a job profile created by the job profiler 120, or a job profile previously stored in the job profile database 122. The job profile describes characteristics of map tasks and reduce tasks. The resource allocator 116 also provides a performance model that calculates a performance parameter (e.g., time duration of the job) based on the characteristics of the job profile, a number of map tasks of the job, a number of reduce tasks of the job, and an allocation of resources (e.g., number of map slots and number of reduce slots).

Using the performance parameter calculated by the performance model, the resource allocator 116 is able to determine a particular allocation of resources to assign to the job to meet the performance goal associated with the job. As noted above, in some implementations, the performance goal is expressed as a target completion time, which can be a target deadline or a target time duration, by or within which the job is to be completed. In such implementations, the performance parameter that is calculated by the performance model is a time duration value corresponding to the amount of time the job would take assuming a given allocation of resources. The resource allocator 116 is able to determine whether the given allocation of resources can meet the performance goal associated with a job by comparing a value of the performance parameter calculated by the performance model to the performance goal.

In some implementations, the resource allocator 116 is able to calculate multiple feasible solutions of allocations of resources to perform a given job, where a "feasible solution" refers to an allocation of resources that allows a system to execute the given job while satisfying the performance goal associated with the given job. The multiple feasible solutions of allocations of resources for the given job can be added to a set of feasible solutions. Then, using some predefined criterion, one of the feasible solutions can be selected from the set to determine the specific allocation of resources for the given job. As discussed further below, the identification of feasible solutions for a given job that satisfy a performance goal associated with the given job can be performed on an iterative basis.

The following describes implementations where the performance goal associated with a job is a target completion time (a deadline or time duration of the job). Note that techniques or mechanisms according to other implementations can be employed with other types of performance goals.

Figure 2A:
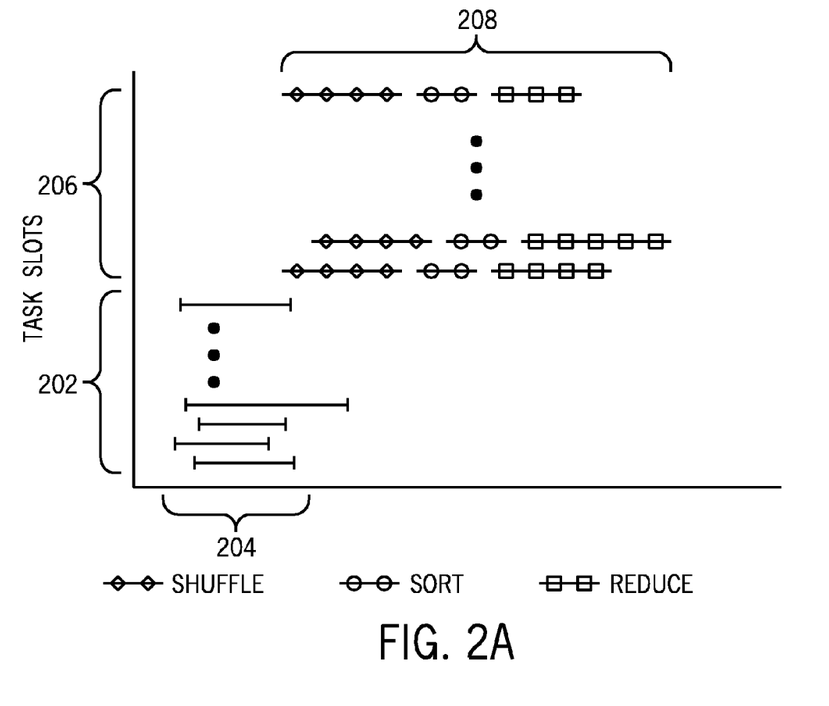
FIGS. 2A-2B are graphs illustrating map tasks and reduce tasks of a job in a MapReduce environment, according to some examples.
Figure 2B:
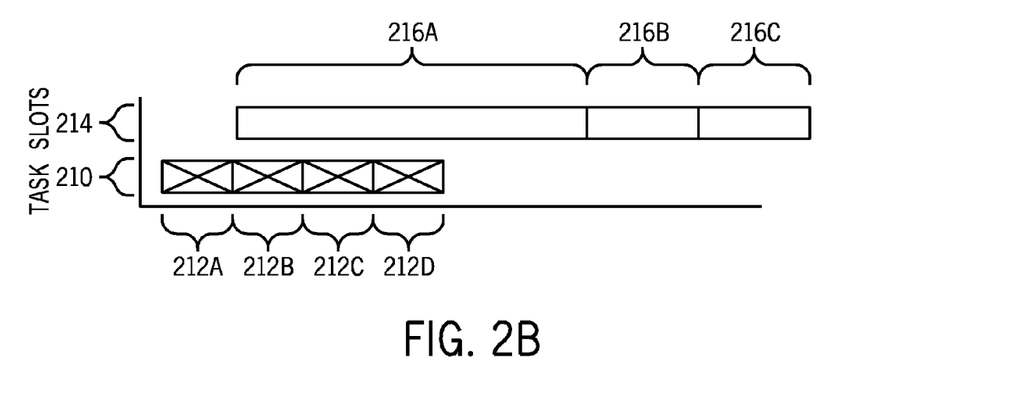

FIGS. 2A and 2B illustrate differences in completion times of performing map and reduce tasks of a given job due to different allocations of map slots and reduce slots. FIG. 2A illustrates an example in which there are 64 map slots and 64 reduce slots allocated to the given job. The example also assumes that the total input data to be processed for the given job can be separated into 64 partitions. Since each partition is processed by a corresponding different map task, the given job includes 64 map tasks. Similarly, 64 partitions of intermediate results output by the map tasks can be processed by corresponding 64 reduce tasks. Since there are 64 map slots allocated to the map tasks, the execution of the given job can be completed in a single map wave.

As depicted in FIG. 2A, the 64 map tasks are performed in corresponding 64 map slots 202, in a single wave (represented generally as 204). Similarly, the 64 reduce tasks are performed in corresponding 64 reduce slots 206, also in a single reduce wave 208, which includes shuffle, sort, and reduce phases represented by different line patterns in FIG. 2A.

A "map wave" refers to an iteration of the map stage. If the number of allocated ma$_p$ slots is greater than or equal to the number of map tasks, then the map stage can be completed in a single iteration (single wave). However, if the number of map slots allocated to the map stage is less than the number of map.tasks, then the map stage would have to be completed in multiple iterations (multiple waves). Similarly, the number of iterations (waves) of the reduce stage is based on the number of allocated reduce slots as compared to the number of reduce tasks.

FIG. 2B illustrates a different allocation of map slots and reduce slots. Assuming the same given job (input data that is divided into 64 partitions), if the number of resources allocated is reduced to 16 map slots and 22 reduce slots, for example, then the completion time for the given job will change (increase). FIG. 2B illustrates execution of map tasks in the 16 map slots 210. In FIG. 2B, instead of performing the map tasks in a single wave as in FIG. 2A, the example of FIG. 2B illustrates four waves 212A, 212B, 212C, and 212D of map tasks. The reduce tasks are performed in the 22 reduce slots 214, in three waves 216A, 216B, and 216C. The completion time of the given job in the FIG. 2B example is greater than the completion time in the FIG. 2A example, since a smaller amount of resources was allocated to the given job in the FIG. 2B example than in the FIG. 2A example.

Thus, it can be observed from the examples of FIGS. 2A and 2B that the execution times of any given job can vary when different amounts of resources are allocated to the job.

Figure 3:
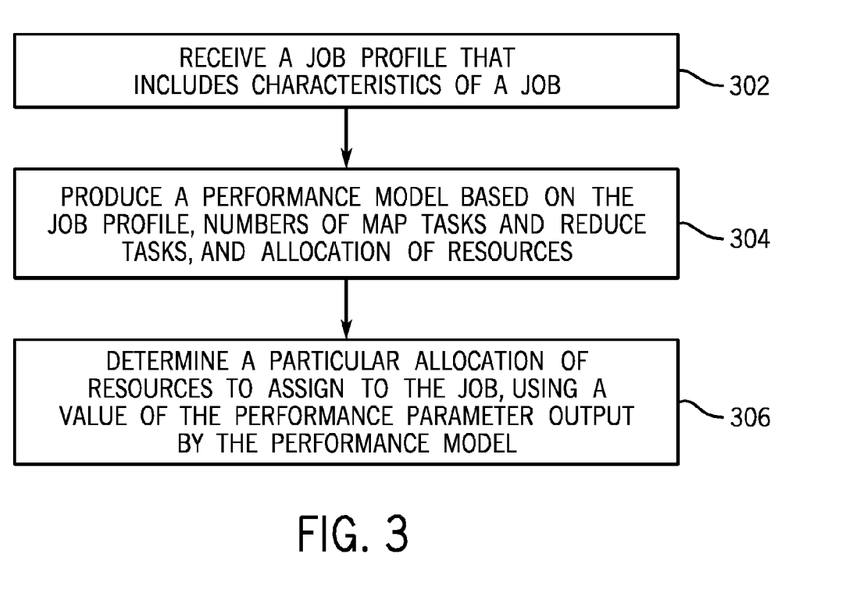
FIG. 3 is a flow diagram of a process of determining allocation of resources to a job, in accordance with some implementations.

FIG. 3 is a flow diagram of a process of allocating resources to a job, according to some implementations. The process includes receiving (at 302) a job profile that includes characteristics of a particular job. Receiving the job profile can refer to a given node (such as the master node 110) receiving the job profile that was created at another node. Alternatively, receiving the job profile can involve the given node creating the job profile, such as by the job profiler 120 in FIG. 1.

Next, a performance model is produced (at 304) based on the characteristics of the job profile, a number of the map tasks in a map stage of the particular job, a number of reduce tasks in a reduce stage of the particular job, and an allocation of resources (e.g., numbers of map slots and reduce slots). The performance model calculates a performance parameter based on the foregoing parameters. In some implementations, the performance parameter is a time duration value that represents the time involved in completing the job given a candidate allocation of resources. The time duration value produced by the performance model is compared to a target completion time of the particular job (in implementations where the performance goal associated with the particular job is the target completion time) for determining whether the candidate allocation of resources can satisfy the performance goal associated with the particular job.

Using a value of the performance parameter calculated by the performance model, the process determines (at 306) a particular allocation of resources to assign to the job to meet the performance goal associated with a job. As noted earlier, multiple feasible allocations of resources can be determined for the particular job, where each of the multiple feasible solutions of allocations of resources satisfies the performance goal associated with the particular job. The particular allocation of resources can be selected from among these feasible solutions according to some criterion (such as a criterion specifying the selection of the allocation of resources with lowest cost, and/or the selection of the allocation of resources with highest performance, and/or other criteria).

In some implementations, the particular job is executed in a given environment (including a system having a specific arrangement of physical machines and respective map and reduce slots in the physical machines), and the job profile and performance model are applied with respect to the particular job in this given environment.

Further details regarding the job profile, performance model, and determination of feasible solutions of resource allocations are discussed below.

A job profile reflects performance invariants that are independent of the amount of resources assigned to the job over time, for each of the phases of the job: map, shuffle, sort, and reduce phases.

The map stage includes a number of map tasks. To characterize the distribution of the map task durations and other invariant properties, the following metrics can be specified in some examples:

$(M_{min}, M_{avg}, M_{max}, \text{AvgSize}_M^{input}, \text{Selectivity}_M)$, where $M_{min}$ is the minimum map task duration. Since the shuffle phase starts when the first map task completes, $M_{min}$ is used as an estimate for the shuffle phase beginning.

$M_{avg}$ is the average duration of map tasks to indicate the average duration of a map wave.

$M_{max}$ is the maximum duration of a map task. Since the sort phase of the reduce stage can start only when the entire map stage is complete, i.e., all the map tasks complete, $M_{max}$ is used as an estimate for a worst map wave completion time.

$\text{AvgSize}_M^{input}$ is the average amount of input data for a map stage. This parameter is used to estimate the number of map tasks to be spawned for a new data set processing.

$\text{Selectivity}_M$ is the ratio of the map data output size to the map data input size. It is used to estimate the amount of intermediate data produced by the map stage as the input to the reduce stage (note that the size of the input data to the map stage is known).

The duration of the map tasks is affected by whether the input data is local to the machine running the task (local node), or on another machine on the same rack (local rack), or on a different machine of a different rack (remote rack). These different types of map tasks are tracked separately. The foregoing metrics can be used to improve the prediction accuracy of the performance model and decision making when the types of available map slots are known.

As described earlier, the reduce stage includes the shuffle, sort and reduce phases. The shuffle phase begins only after the first map task has completed. The shuffle phase (of any reduce wave) completes when the entire map stage is complete and all the intermediate data generated by the map tasks have been shuffled to the reduce tasks.

The completion of the shuffle phase is a prerequisite for the beginning of the sort phase. Similarly, the reduce phase begins only after the sort phase is complete. Thus the profiles of the shuffle, sort, and reduce phases are represented by their average and maximum time durations. In addition, for the reduce phase, the reduce selectivity, denoted as $\text{Selectivity}_R$, is computed, which is defined as the ratio of the reduce data output size to its data input size.

The shuffle phase of the first reduce wave may be different from the shuffle phase that belongs to the subsequent reduce waves (after the first reduce wave). This can happen because the shuffle phase of the first reduce wave overlaps with the map stage and depends on the number of map waves and their durations. Therefore, two sets of measurements are collected:

($Sh_{avg}^1, Sh_{max}^1$) for a shuffle phase of the first reduce wave (referred to as the "first shuffle phase"), and ($Sh_{avg}^{typ}, Sh_{max}^{typ}$) for the shuffle phase of the subsequent reduce waves (referred to as "typical shuffle phase"). Since techniques according to some implementations are looking for the performance invariants that are independent of the amount of allocated resources to the job, a shuffle phase of the first reduce wave is characterized in a special way and the parameters ($Sh_{avg}^1$ and $Sh_{max}^1$) reflect only durations of the non-overlapping portions (non-overlapping with the map stage) of the first shuffle. In other words, the durations represented by $Sh_{avg}^1$ and $Sh_{max}^1$ represent portions of the duration of the shuffle phase of the first reduce wave that do not overlap with the map stage.

Thus, the job profile in the shuffle phase is characterized by two pairs of measurements:

$$(Sh_{avg}^1, Sh_{max}^1), (Sh_{avg}^{typ}, Sh_{max}^{typ}).$$

If the job execution has only a single reduce wave, the typical shuffle phase duration is estimated using the sort benchmark (since the shuffle phase duration is defined entirely by the size of the intermediate results output by the map stage).

As noted above, the performance model used for determining a feasible allocation of resources for a job calculates a performance parameter. In some implementations, the performance parameter can be expressed as an upper bound parameter or a lower bound parameter or some determined intermediate parameter between the lower bound and upper bound (e.g., average of the lower and upper bounds). In implementations where the performance parameter is a completion time value, the lower bound parameter is a lower bound completion time, the upper bound parameter is an upper bound completion time, and the intermediate performance parameter is an intermediate completion time (e.g., average completion time that is an average of the upper and lower completion). In other implementations, instead of calculating the average of the upper bound and lower bound to provide the intermediate performance parameter, a different intermediate parameter can be calculated, such as a value based on a weighted average of the lower and upper bounds or application of some other predefined function on the lower and upper bounds.

In some examples, the lower and upper bounds are for a makespan (a completion time of the job) of a given set of n (n>1) tasks that are processed by k (k>1) servers (or by k slots in a MapReduce environment). Let $T_1, T_2, \ldots, T_n$ be the durations of n tasks of a given job. Let k be the number of slots that can each execute one task at a time. The assignment of tasks to slots is done using a simple, online, greedy algorithm, e.g., assign each task to the slot with the earliest finishing time.

Let $\mu = (\sum_{i=1}^{n} T_i)/n$ and $\lambda = \max_i \{T_i\}$ be the mean and maximum durations of the n tasks, respectively. The makespan of the greedy task assignment is at least $n \cdot \mu/k$ and at most $(n-1) \cdot \mu/k + \lambda$. The lower bound is trivial, as the best case is when all n tasks are equally distributed among the k slots (or the overall amount of work $n \cdot \mu$ is processed as fast as it can by k slots). Thus, the overall makespan (completion time of the job) is at least $n \cdot \mu/k$ (lower bound of the completion time).

For the upper bound of the completion time for the job, the worst case scenario is considered, i.e., the longest task (T)∈ ($T_1, T_2, \ldots, T_n$) with duration $\lambda$ is the last task processed. In this case, the time elapsed before the last task is scheduled is $(\sum_{i=1}^{n-1} T_i)/k \leq (n-1) \cdot \mu/k$. Thus, the makespan of the overall assignment is at most $(n-1) \cdot \mu/k + \lambda$. These bounds are particularly useful when $\lambda \ll n \cdot \mu/k$, in other words, when the duration of the longest task is small as compared to the total makespan.

The difference between lower and upper bounds (of the completion time) represents the range of possible job completion times due to non-determinism and scheduling. As discussed below, these lower and upper bounds, which are part of the properties of the performance model, are used to estimate a completion time for a corresponding job J.

The given job J has a given profile created by the job profiler 120 (FIG. 1) or extracted from the profile database 122. Let J be executed with a new input dataset that can be partitioned into $N_M$ map tasks and $N_R$ reduce tasks. Let $S_M$ and $S_R$ be the number of map slots and number of reduce slots, respectively, allocated to job J.

Let $M_{avg}$ and $M_{max}$ be the average and maximum time durations of map tasks (defined by the job J profile). Then, based on the Makespan theorem, the lower and upper bounds on the duration of the entire map stage (denoted as $T_M^{up}$ and $T_M^{up}$, respectively) are estimated as follows:

$$T_M^{low} = N_M/S_M \cdot M_{avg},$$

$$T_M^{up} = (N_M - 1)/S_M \cdot M_{avg} + M_{max}.$$

Stated differently, the lower bound of the duration of the entire map stage is based on a product of the average duration ($M_{avg}$) of map tasks multiplied by the ratio of the number map tasks ($N_M$) to the number of allocated map slots ($S_M$). The upper bound of the duration of the entire map stage is based on a sum of the maximum duration of map tasks ($M_{max}$) and the product of $M_{avg}$ with $(N_M - 1)/S_M$. Thus, it can be seen that the lower and upper bounds of durations of the map stage are based on properties of the job J profile relating to the map stage, and based on the allocated number of map slots.

The reduce stage includes shuffle, sort and reduce phases. Similar to the computation of the lower and upper bounds of the map stage, the lower and upper bounds of time durations for each of the shuffle phase ($T_{Sh}^{low}, T_{Sh}^{up}$), sort phase ($T_{Sort}^{low}, T_{Sort}^{up}$), and reduce phase ($T_R^{low}, T_R^{up}$) are computed. The computation of the Makespan theorem is based on the average and maximum durations of the tasks in these phases (respective values of the average and maximum time durations of the shuffle phase, the average and maximum time durations of the sort phase, and the average and maximum time duration of the reduce phase) and the numbers of reduce tasks $N_R$ and allocated reduce slots $S_R$, respectively. The formulae for calculating ($T_{Sh}^{low}, T_{Sh}^{up}$), ($T_{Sort}^{low}, T_{Sort}^{up}$), and ($T_R^{low}, T_R^{up}$) are similar to the formulae for calculating $T_M^{up}$ and $T_M^{up}$ set forth above, except variables associated with the reduce tasks and reduce slots and the respective phases of the reduce stage are used instead.

The subtlety lies in estimating the duration of the shuffle phase. As noted above, the first shuffle phase is distinguished from the task durations in the typical shuffle phase (which is a shuffle phase subsequent to the first shuffle phase). As noted above, the first shuffle phase includes measurements of a portion of the first shuffle phase that does not overlap the map stage. The portion of the typical shuffle phase in the subsequent reduce waves (after the first reduce wave) is computed as follows:

$$T_{Sh}^{low} = \left(\frac{N_R}{S_R} - 1\right) \cdot Sh_{avg}^{typ},$$

$$T_{Sh}^{up} = \left(\frac{N_R - 1}{S_R} - 1\right) \cdot Sh_{avg}^{typ} + Sh_{max}^{typ}.$$

where $Sh_{avg}^{typ}$ is the average duration of a typical shuffle phase, and $Sh_{max}^{typ}$ is the average duration of the typical shuffle phase. The formulae for the lower and upper bounds of the overall completion time of job J are as follows:

$$T_J^{low} = T_M^{low} + Sh_{avg}^1 + T_{Sh}^{low} + T_{Sort}^{low} + T_R^{low}, \quad \text{(Eq. 1)}$$

$$T_J^{up} = T_M^{up} + Sh_{max}^1 + T_{Sh}^{up} + T_{Sort}^{up} + T_R^{up}, \quad \text{(Eq. 2)}$$

where $Sh_{avg}^1$ is the average duration of the first shuffle phase, and $Sh_{max}^1$ is the maximum duration of the first shuffle phase. $T_J^{low}$ and $T_J^{up}$ represent optimistic and pessimistic predictions (lower and upper bounds) of the job J completion time. Thus, it can be seen that the lower and upper bounds of time durations of the job J are based on properties of the job J profile and based on the allocated numbers of map and reduce slots. The properties of the performance model, which include $T_J^{low}$ and $T_J^{up}$ in some implementations, are thus based on both the job profile as well as allocated numbers of map and reduce slots.

In some implementations, an intermediate performance parameter value, such as an average value between the lower and upper bounds, $T_J^{avg}$ is defined as follows:

$$T_J^{avg} = (T_M^{up} + T_J^{low})/2. \quad \text{(Eq. 3)}$$

In other implementations, other types of intermediate performance parameters can be calculated, such as a weighted average or a value calculated by application of another pre-defined function.

As noted above, for a job, it is desired to determine a feasible allocation of resources for the job that satisfies a performance goal associated with the job. There is a monotonicity property for MapReduce environments. For job J with a given profile, let $S_M^J$ and $S_R^J$ be the number of map and reduce slots allocated to job J, respectively. Let $T_J^{low}$ and $T_J^{up}$ be the low and upper bounds of the job J overall completion time when executed with $S_M^J$ and $S_R^J$ map and reduce slots, respectively. If a larger number of map and reduce slots $\hat{S}_M^J \geq S_M^J$ and $\hat{S}_R^J \geq S_R^J$ is allocated to job J and $\hat{T}_J^{low}$ and $\hat{T}_J^{up}$ are and new computed low and upper bounds of the job J execution that uses the increased amount of map and reduce slots $\hat{S}_M^J$ and $\hat{S}_R^J$, respectively, then $\hat{T}_J^{low} \leq T_J^{low}$ and $\hat{T}_J^{up} \leq T_J^{up}$.

Given the monotonicity property, the problem can be formulated as follows. Given a job J with input data set D that can be partitioned into $N_M^J$ map tasks and $N_R^J$ reduce tasks, combinations $(S_M^J, S_R^J)$ of map and reduce slots, respectively, to be allocated to job J are identified to allow the job to finish within or by target completion time T, where time T is a performance goal.

There are a few choices for designing a performance model to answer this question.

A first choice is to specify that the target completion time T is targeted as a lower bound of the job completion time. Typically, this leads to the smallest amount of resources that is to be allocated to the job for achieving the target completion time T. The lower bound of the completion time corresponds to ideal computation using the allocated resources, and may not be achievable in certain environments.

A second choice is to specify that the target completion time T is targeted as an upper bound of the job completion time. Typically, this leads to more aggressive (larger amount of) resource allocations for achieving a target completion time T. This approach assumes a worst case scenario. This larger amount of allocated resources may lead to an actual completion time that is smaller (better) than the target completion time T because the worst case scenario may not be present in an actual environment.

A third choice is to specify that the target completion time T is an average of (or some other intermediate value between) lower and upper bounds on the target completion time. This approach can lead to more balanced resource allocation, and may provide a solution that more closely achieves the target completion time T (without under-allocating or over-allocating resources as with the approaches of the first and second choices above).

The pseudocode below provides a computation for finding the combinations of map and reduce slots that provide feasible solutions when the target completion time T is specified as a lower bound of the job completion time; effectively, Eq. 1 set forth above is used. In alternative implementations, the pseudocode can be modified to apply Eq. 2 or 3, to provide a computation according to T being considered an upper bound or an average job completion time, respectively.

```
Initialization:
if (N_M^J ≤ S_M){S_M^J ⇐ N_M^J} else (S_M^J ⇐ S_M); continued ⇐ true;
Main Computation:
while continue {
    T_M^low ⇐ (N_M^J/S_M^J) · M_avg;
    Solving for the minimal S_R^J that satisfies the following inequality:
    T_M^low + Sh_avg^1 + (N_R^J/S_R^J − 1) · Sh_avg^typ + (N_R^J/S_R^J) · (Sort_avg +
    R_avg) ≤ T;
    if (S_R^J > 0)&(S_R^J ≤ S_R) {
        Add (S_M^J, S_R^J) to a list L_low^J of feasible solutions.
        S_M^J ⇐ S_M^J − 1; // decreasing the number of map slots for the
        next iteration.
    }
    else { // there is no a feasible solution for a current value of S_M^J;
        continue ⇐ false;
    }
}
```

The foregoing pseudocode identifies pairs $(S_M^J, S_R^J)$ of minimal allocations of map and reduce slots that support job J completion time T as a lower bound. In the pseudocode above, the allocation of map slots is initially set to the largest possible allocation, by considering the total number of map tasks $N_M^J$ that job J should process and the number of map slots $S_M$ available in the system. Note that $S_M$ (the total number of map slots available in the system) would be shared among multiple jobs if multiple jobs are to be concurrently executed, so all $S_M$ map slots may not be available for the job J under consideration. If $N_M^J \leq S_M$ (the number of map tasks of the job J is less than or equal to the total number $S_M$ of map slots in the system), then the map slot allocation (number of allocated map slots $S_M^J$) is set equal to $N_M^J$; otherwise $S_M^J$ is set to $S_M$.

Using this map slot allocation (denoted as $S_M^J$), the amount of reduce slots (denoted as $S_R^J$) for completing job J within time T is calculated while using the lower bound equation Eq. 1 for estimating the job completion time. If a calculated value of $S_R^J$ is positive and less than the overall number of reduce slots available in the system, then pair $(S_M^J, S_R^J)$ represents a feasible solution for achieving a given performance goal. The situation when a calculated value of $S_R^J$ is negative corresponds to the case when the predicted completion time of a map stage under the current map slot allocation $S_M^J$ is higher than a given time T. This means that job J cannot complete within T with allocated map slots $S_M^J$. A similar situation occurs when the calculated number of reduce slots for completing job J within time T is higher than the overall number of available reduce slots $S_R^J$ in the system.

When a feasible solution $(S_R^J, S_M^J)$ is found, the pseudocode adds the feasible solution to a list $L_{low}^J$. The pseudocode then performs the next iteration with a reduced number of map slots ($S_M^J = S_M^J − 1$). In this manner, the pseudocode sweeps (iterates) through the entire range of map slot allocations $S_M^J$ and finds the corresponding numbers of reduce slots $S_R^J$ for completing the job within time T.

In alternative implementations, instead of iterating through the entire range of map slot allocations ($S_M^J$) to find feasible reduce slot allocations ($S_R^J$), as in the pseudocode above, a different approach can iterate through the entire range of reduce slot allocations ($S_R^J$) to find corresponding numbers of maps slots for completing the job within time T. A pseudocode to perform this alternative approach is set forth below.

```
Initialization:
if (N_R^J ≤ S_R){S_R^J ⇐ N_R^J} else (S_R^J ⇐ S_R); continued ⇐ true;
Main Computation:
while continue {
    T_{R-stage}^{low} ⇐ Sh_{avg}^1 + (N_R^J/S_R^J − 1) · Sh_{avg}^{typ} + (N_R^J/S_R^J) · (Sort_{avg} + R_{avg});
    Solving for the minimal S_M^J that satisfies the following inequality:
    (N_M^J/S_M^J) · M_{avg} + T_{R-stage}^{low} ≤ T;
    if (S_M^J > 0)&(S_M^J ≤ S_M) {
        Add (S_M^J, S_R^J) to a list L_{low}^J of feasible solutions.
        S_R^J ⇐ S_R^J − 1; // decreasing the number of reduce slots for the
        next iteration.
    }
    else { // there is no a feasible solution for a current value of S_R^J;
        continued ⇐ false;
    }
}
```

The foregoing identifies pairs ($S_M^J$, $S_R^J$) of allocations of map and reduce slots that support job J completion time T as a lower bound.

The foregoing two approaches are symmetrical and provide similar results. For further enhanced efficiency, the amount of computations involved in the two approaches can be assessed, and one of the two approaches which may lead to a shorter computation can be selected.

For example, let job J be represented by: $N_M$=10,000 map tasks, and $N_R$=100 reduce tasks. Let the size of a given distributed computing environment be: $S_M$=1000 map slots, and $S_R$=1000 reduce slots.

In the above example, the approach that sweeps through the entire range of allocations of map slots may involve up to 1000 iterations, while the approach that sweeps through the entire range of allocations of reduce slots may involve up to 100 iterations. Therefore, the latter approach (second pseudocode set forth above) used for enhanced efficiency.

More generally, a decision on which approach to invoke is made by comparing $M_{Iter}$ and $R_{Iter}$ defined as follows: $M_{Iter}$=min($N_M$, $S_M$) and $R_{Iter}$=min($N_R$, $S_R$). If $M_{Iter} \leq R_{Iter}$, then it is better to use the map-driven approach (first pseudocode set forth above); otherwise the reduce-based approach (second pseudocode set forth above) is a more efficient.

The computation of allocation of resources of a job can be performed relatively quickly using techniques or mechanisms according to some implementations, since the calculations as discussed above are relatively simple. As a result, the master node 110 (FIG. 1) or other decision maker in a distributed processing framework (such as a MapReduce framework) can quickly obtain such allocation of resources to make decisions, such as scheduling decisions, and so forth.

Machine-readable instructions of modules described above (including 116, 120, 122 in FIG. 1) are loaded for execution on one or more CPUs (such as 124 in FIG. 1). A CPU can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a system having a processor, a job profile of a job, wherein the job profile describes characteristics of map tasks and reduce tasks, wherein the map tasks produce intermediate results based on segments of input data, and the reduce tasks produce an output based on the intermediate results;
   providing, in the system, a performance model that calculates a performance parameter based on the characteristics of the job profile, a number of the map tasks, a number of the reduce tasks, and an allocation of resources;
   identifying, in the system, plural feasible solutions including corresponding different allocations of resources for which respective values of the performance parameter calculated by the performance model satisfy a performance goal associated with the job, wherein each of the different allocations of resources includes a respective number of map slots in which the map tasks are performed, and a respective number of reduce slots in which the reduce tasks are performed; and
   determining, by the system, a particular allocation of resources selected from the plural feasible solutions to assign to the job to meet the performance goal.

2. The method of claim 1, wherein identifying the plural feasible solutions comprises:
   determining whether the corresponding value of the performance parameter calculated by the performance model for each of the plural feasible solutions satisfies the performance goal.

3. The method of claim 2, wherein the performance goal is a completion time, and wherein the performance parameter is a time value.

4. The method of claim 2, wherein the performance parameter calculated by the performance model is one of a lower bound parameter, an upper bound parameter, and an intermediate parameter between the lower bound parameter and the upper bound parameter.

5. The method of claim 1, wherein determining the particular allocation of resources comprises selecting from among the feasible solutions in the set according to a predefined criterion.

6. The method of claim 1, wherein the performance parameter is computed by the performance model further based on a number of map slots, a number of reduce slots, an average time duration of a map task, an average time duration of a shuffle phase in a reduce stage that includes the reduce tasks, an average of time duration of a sort phase in the reduce stage, and an average time duration of a reduce phase in the reduce stage.

7. An article comprising at least one non-transitory machine-readable storage medium storing instructions that upon execution cause a system having a processor to:
receive a job profile describing a job to be performed in a distributed computing platform having resources, wherein the job profile includes characteristics of a map stage and a reduce stage of the job, the map stage processing input data to produce an intermediate result, and the reduce stage to process the intermediate result to produce an output;
use the characteristics of the job profile to calculate corresponding values of a performance parameter for respective different allocations of resources for the job, wherein the performance parameter is computed based on a number of map tasks in the map stage, a number of reduce tasks in the reduce stage, a number of map slots, a number of reduce slots, an average time duration of a map task, an average time duration of a shuffle phase in the reduce stage, an average time duration of a sort phase in the reduce stage, and an average time duration of a reduce phase in the reduce stage; and
determine, based on the values of the performance parameter, a specific allocation of the resources for the job that satisfies a performance goal.

8. The article of claim 7, wherein the specific allocation of resources is a feasible solution, and wherein the instructions upon execution cause the system to further:
identify plural feasible solutions including corresponding different allocations of resources for which respective values of the performance parameter satisfy the performance goal.

9. The article of claim 8, wherein each of the different allocations of resources of the feasible solutions includes a respective number of map slots and a respective number of reduce slots, where the map tasks are performed in the map slots, and the reduce tasks are performed in the reduce slots, and wherein identifying the plural feasible solutions comprises:
iterating through a range of numbers of the map slots; and
for each of the numbers of map slots in the range, determining if there is a number of reduce slots for which a calculated value of the performance parameter satisfies the performance goal.

10. The article of claim 8, wherein each of the allocations of resources of the feasible solutions includes a respective number of map slots and a respective number of reduce slots, where the map tasks are performed in the map slots, and the reduce tasks are performed in the reduce slots, and wherein identifying the plural feasible solutions comprises:
iterating through a range of numbers of the reduce slots; and
for each of the numbers of reduce slots in the range, determining if there is a number of map slots for which a calculated value of the performance parameter satisfies the performance goal.

11. The article of claim 7, wherein the specific allocation of the resources for the job includes a number of map slots and a number of reduce slots, wherein the map slots of the specific allocation are used for executing tasks of the map stage, and the reduce slots of the specific allocation are used for executing tasks of the reduce stage.

12. The article of claim 11, wherein the distributed computing platform has plural physical machines, where each physical machine has a respective set of map and reduce slots.

13. The article of claim 7, wherein the performance goal is a target completion time.

14. The article of claim 7, wherein the performance parameter is an upper bound performance parameter computed further based on a maximum time duration of a map task, a maximum time duration of the shuffle phase, a maximum time duration of the sort phase, and a maximum time duration of the reduce phase.

15. The article of claim 7, wherein the performance parameter is an intermediate performance parameter between an upper bound and a lower bound,
wherein the lower bound is computed based on the number of map tasks in the map stage, the number of reduce tasks in the reduce stage, the number of map slots, the number of reduce slots, the average time duration of a map task, the average time duration of the shuffle phase, the average time duration of the sort phase, and the average time duration of the reduce phase, and
wherein the upper bound is computed based on the number of the map tasks in the map stage, the number of reduce tasks in the reduce stage, the number of map slots, the number of reduce slots, the average time duration of a map task, a maximum time duration of a map task, the average time duration of the shuffle phase, a maximum time duration of the shuffle phase, the average time duration of the sort phase, a maximum time duration of the sort phase, the average time duration of the reduce phase, and a maximum time duration of the reduce phase.

16. The article of claim 7, wherein the performance parameter is a lower bound performance parameter.

17. A system comprising:
storage media to store a job profile, wherein the job profile describes a job including a map stage to produce an intermediate result based on input data, and a reduce stage to produce an output based on the intermediate result; and
at least one processor to:
provide a performance model that calculates a performance parameter based on the job profile, a number of map tasks in the map stage, a number of reduce tasks in the reduce stage, a number of map slots in which the map tasks are performed, a number of reduce slots in which the reduce tasks are performed, an average time duration of a map task, an average time duration of a shuffle phase in the reduce stage, an average time duration of a sort phase in the reduce stage, and an average time duration of a reduce phase in the reduce stage; and determine, using a value of the performance parameter calculated by the performance model, a particular allocation of resources to assign to the job to meet a performance goal associated with the job.

* * * * *